Patented Mar. 21, 1950

2,501,272

UNITED STATES PATENT OFFICE 2,501,272

PROCESS FOR CLARIFYING IMPURE SUGAR SOLUTIONS

John Godston, Staten Island, N. Y.

No Drawing. Application April 24, 1946,
Serial No. 664,698

10 Claims. (Cl. 127—48)

The present invention relates to a process for clarifying sugar solutions containing various impurities which affect color and taste and more particularly to such a process in which there is employed an adsorbent or filter aid of vegetable origin.

As is well known, the original and only partially refined solutions obtained from sugar bearing plants such as cane, beet and sorghum and from starchy materials converted to sugar and honey contain many undesirable impurities. For example, cane molasses of blackstrap grade is very dark in color and extremely bitter. These undesirable taste and color producing impurities include various decomposition products of the sugars such as caramel and gums, dextrines, minerals, various cellulose degradation products, proteins, acids, etc.

It is readily apparent, therefore, that before these impure sugar solutions can be employed in the manufacture of crystalline sugars or as the more refined grades of molasses and syrups it is necessary that all or many of the impurities be removed from the crude solution. It has long been the practice in the art to employ various adsorbents and filter aids such as bone and vegetable chars, lime and other calcium compounds, calcium acid phosphates and other phosphates, and diatomaceous earth in accomplishing this end. However, all of the above substances are initially quite expensive, soon rendered unfit for further use, or inefficient for the purpose intended.

It is a primary object of the present invention to provide a process which will remove the impurities from an impure sugar solution, but with the concurrent removal of sugar therefrom kept at a minimum.

It is another object of the present invention to provide a process for clarifying and purifying impure sugar solutions, which is extremely economical and efficient.

It is a further object of the present invention to provide a process for refining impure sugar solutions, which utilizes a cheap and readily obtainable vegetable product.

It is another object of the present invention to provide an economical and efficient process for purifying crude sugar solutions, which will at the same time provide as a by-product a material having value as a food for animals.

Other and further objects of the invention will be readily apparent from the following detailed description thereof.

I have found that various comminuted vegetable materials high in protein content and preferably in the form of flours or meals provide excellent adsorbents and filter aids to be employed in connection with sugar refining processes. Examples of such flours or meals are those which are prepared from cotton seeds, soyabeans, rape seeds, squash and pumpkin seeds and peanuts. The preferred material to be employed in my process is cottonseed flour or meal, which provides an extremely efficient adsorbent and filter aid, and in addition is quite cheap and readily obtainable in large quantities, being a by-product of the cottonseed oil industry.

As most commonly obtained from the industry, the cottonseed flour or meal contains the comminuted hull as well as the kernel of the seed, as the hull is not removed before the seed is ground and the oil expressed therefrom. Such a product is well adapted for use in my process, but I have found that even better results are obtained if a special de-hulled cottonseed flour or meal is used. This de-hulled product is best obtained by removing the lint and branny outer coating or hull before cooking, grinding and expressing the oil by means of pressure.

It is to be understood, of course, that a flour or meal, which is the result of a mere grinding operation, and from which none of the oil or other fatty materials has been removed is also effective in my process, but it is a totally or partially de-fatted product, which yields the best result, indicating that it is the protein content thereof which is responsible in a large measure for its effective action.

Specifically, the present invention comprises mixing with the impure sugar solution in the neighborhood of one percent (1%) by weight of comminuted cottonseed based on the total solid content of the impure solution. For best results the flour or meal is added with agitation and it is to be understood that the amount thereof can vary considerably in both directions from the optimum of one percent (1%) as set forth, the variance depending on the relative amounts of impurities existing in the sugar solutions. After contact has been maintained for a period of time sufficient to adsorb the various impurities in the solution, the greatly clarified sugar solution is separated from the flour or meal and adsorbed impurities by any of the known methods such as filtering, decantation or centrifuging.

The above process has been carried out with a cold solution with good results, but it is found that far better results are obtained with all of the protein materials if the solution is heated before or after the addition of the flour or meal, and heating to a boiling temperature is recommended. When the mixture is heated, pronounced flocculation is observed which apparently aids greatly in filtering out the various impurities.

In connection with the flocculation mentioned above, it has also been found that a control of the pH aids considerably in producing the phenomenon. More pronounced flocculation is observed when the solution is slightly acid, and when the process employs cottonseed flour or meal a pH range of 6 to 6.8 has been found to yield the best results, but it is to be understood that other pH values above or below this range also produce good results.

In general it has been found that the greater the degree of flocculation occurring, the greater is the resulting degree of clarification and purification of the impure sugar solution.

It has also been found important in connection with the process to control the concentration of the sugar solution. In the case of ordinary molasses which has a Baumé of about 40° at 20° C. it has been found highly desirable to dilute the same with about an equal amount of water, in which case the flocculant precipitate forms much more readily and is more easily separated after substantial removal of the various impurities has been completed. The filtrate is then sweet, lacking much of the bitterness of the molasses and is greatly lightened in color. The filtrate as is or evaporated to a desired higher concentration is an excellent, edible product.

The exact nature of the reaction resulting in the removal of the impurities is not known. It is felt that the physical reaction of adsorption plays a major role, but reactions other than adsorption may well enter into the process. For example, there may be a disturbance of colloidal dispersion and/or the formation of a new chemical compound precipitate.

Moreover, the separated cottonseed flour or meal together with adsorbed purities thereon is of itself a quite valuable product. When dried and compressed, it forms an excellent and nutritious food for live stock of all kinds.

Of course, it is to be understood that the protein containing materials of this invention may also be employed in conjunction with the heretofore known and widely used clarifying agents listed earlier in this specification.

Having described my invention, I claim:

1. The method of refining an impure sugar solution comprising mixing finely divided soy bean with said solution in quantity sufficient to form a precipitate and thereafter separating the precipitate.

2. The method of refining an impure sugar solution comprising mixing finely divided protein-containing seeds of a plant with said solution in quantity sufficient to form a precipitate and thereafter separating the precipitate.

3. The method of refining an impure sugar solution comprising mixing finely divided plant seeds of high protein content with said solution in quantity sufficient to form a precipitate and at an elevated temperature approximating the boiling point of said solution and thereafter separating the precipitate.

4. The process of refining an impure sugar solution comprising contacting with agitation finely divided plant seeds of high protein content with said solution in quantity sufficient to form a precipitate and at an elevated temperature approximating the boiling point of said solution and thereafter separating the precipitate.

5. The method of refining an impure sugar solution comprising mixing finely divided cotton seeds with said solution in quantity sufficient to form a precipitate and thereafter separating the precipitate.

6. The method of refining an impure sugar solution comprising adjusting the pH of said solution within the range 6-6.8, mixing finely divided cotton seeds with said solution in quantity sufficient to form a precipitate and thereafter separating the precipitate.

7. The method of refining an impure sugar solution comprising mixing finely divided cotton seeds with said solution in quantity sufficient to form a precipitate and at an elevated temperature approximating the boiling point of said solution and thereafter separating the precipitate.

8. The method of refining an impure sugar solution comprising mixing approximately one percent by weight of finely divided cotton seeds based on the total solids content of said solution with said solution at an elevated temperature approximating the boiling point of said solution so as to form a precipitate and thereafter separating the precipitate.

9. The method of refining an impure sugar solution comprising adjusting the pH of said solution within the range 6-6.8, contacting with agitation approximately one percent by weight of finely divided cotton seeds based on the solids content of said solution with said solution at an elevated temperature approximating the boiling point of said solution so as to form a precipitate and thereafter separating the precipitate.

10. The method of refining a highly concentrated impure sugar solution comprising diluting said solution with water, mixing finely divided cotton seeds with said diluted solution in quantity sufficient to form a precipitate and thereafter separating the precipitate.

JOHN GODSTON.

REFERENCES CITED

The following references are of record in the file of this patent:

UNITED STATES PATENTS

| Number | Name | Date |
|---|---|---|
| 90,616 | Wandel | May 25, 1869 |
| 303,776 | Willcox | Aug. 16, 1884 |
| 455,675 | Weinrich | July 7, 1891 |
| 527,670 | Descamps | Oct. 16, 1894 |
| 1,960,617 | Bennett | May 29, 1934 |
| 2,066,141 | Copland | Dec. 29, 1936 |
| 2,221,815 | Rice | Nov. 19, 1940 |
| 2,258,260 | Rice | Oct. 7, 1941 |
| 2,271,499 | Rice | Jan. 27, 1942 |

FOREIGN PATENTS

| Number | Country | Date |
|---|---|---|
| 628,599 | France | Oct. 26, 1927 |

OTHER REFERENCES

Chang, L. T.: "Native Method of Sugar Manufacturing in Szechuan," Bulletin No. 282, May 31, 1941, The National Bureau of Industrial Research, Chungking, China. (Paragraph beginning at line 11, column 2, of page 13.)